Feb. 25, 1941.　　　J. PONSAING　　　2,232,799
COUPLING
Filed Dec. 19, 1938
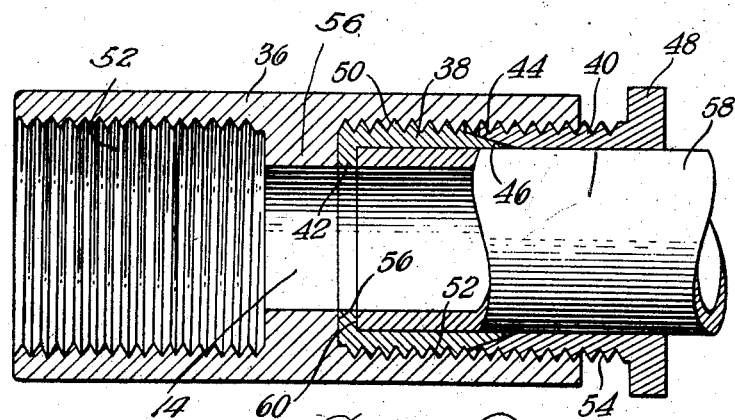
John Ponsaing.
INVENTOR
BY Victor J. Evans & Co.
ATTORNEYS Patented Feb. 25, 1941

2,232,799

UNITED STATES PATENT OFFICE 2,232,799

COUPLING

John Ponsaing, Chicago, Ill

Application December 19, 1938, Serial No. 246,735

3 Claims. (Cl. 285—166)

My invention relates to improvements in pipe connections, and has among its objects and advantages the provision of an improved metallic packing and connector.

An object of my invention is to provide a connecting means and packing wherein a packing sleeve of malleable material is effectively deformed about the peripheral surface of a pipe for connecting the same with another sectional pipe in addition to effecting a sealed joint. My invention embodies a coupling member internally threaded and provided with an internal, radial flange. The packing sleeve is threaded for insertion in one end of the coupling member, and the pipe to be coupled has one end positioned inside the malleable sleeve. I provide means for deforming the malleable sleeve so as to contract the same upon the pipe to be coupled as well as to press an end flange on the sleeve against the flange of the coupling member so as to effectively seal the end of the pipe to be coupled with respect to the internal flange, in addition to contracting the sleeve and expanding the same with respect to the pipe to be coupled and the coupling member, respectively.

In the accompanying drawing:

The single figure is a longitudinal vertical section of a joint embodying my invention.

In the embodiment selected to illustrate my invention, I make use of a coupling member 36 which is provided with an internal, radial flange 56 intermediate its ends. Flange 56 is provided with an opening 14 of sufficient diameter for the free passage of fluid, which diameter conforms to the inside diameter of the pipe or pipe sections to be coupled. The member 36 is provided with internal threads 52.

The malleable sleeve 38 is designed for cooperation with a compression sleeve 40 of non-malleable material. Malleable sleeve 38 includes an end flange 42 and is shaped to provide a taper 44 arranged to fit inside the taper 46 of the compression sleeve 40. The latter is fashioned with an end flange 48 to facilitate the application of a wrench thereto.

Sleeve 38 is fashioned with external threads 50 which originally fit loosely with respect to the internal threads 52 of the coupling member 36. Compression sleeve 40 is also threaded at 54 for threaded relation with the threads 52. Sleeve 38 is easily turned home because of the loose fitting relation between the threads 50 and 52. The sleeve is threaded down to bring its flange 42 into pressure relation with the coupling flange 56, after which the pipe section 58 has one end inserted into the sleeve 38 with its end 60 abutting the flange 42. Compression sleeve 40 closely embraces the pipe section 58 and has close fitting relation with the threads 52. As the compression sleeve 40 is turned down, the angular face 46 engages the angular face 44 on the malleable sleeve 38 for compressing the same upon the pipe section 58 in addition to compressing the sleeve so as to cause contraction thereof throughout its entire length upon the embraced end of the pipe section 58. At the same time, deformation of the malleable sleeve causes expansion of the same for forcing its threads 50 into effective pressure relation with the internal threads 52 of the coupling member 36. Such deformation of the sleeve causes the sleeve flange to be effectively compressed between the coupling flange and the end of the pipe section. The single figure of the drawing illustrates one pipe section only, connected with the coupling member. Both ends of the coupling members will be connected with a companion pipe section in the same manner.

Without further elaboration, the foregoing will so fully illustrate my invention that others may, by applying current knowledge, readily adapt the same for use under various conditions of service.

I claim:

1. In combination in a pipe joint, a tubular coupling member having an internal annular flange, and a tubular extension on each side of the annular flange, internal threads in each of the tubular extensions, a pipe section extending into each of the tubular extensions and radially spaced therefrom and axially spaced from the sides of the annular flange, a malleable sleeve tightly pressed between each of the pipe sections and the tubular extensions, each of said malleable sleeves having a flange pressed between said annular flange and the end of that respective pipe section, each of said malleable sleeves also having a tapered portion, and a compression sleeve having a tapered portion in each of the tubular extensions having threaded engagement with the threads therein which when forced against the malleable sleeve effects said tight pressing and the pressing of the malleable sleeve flange between said annular flange and the pipe end.

2. In combination in a pipe joint, a tubular coupling member having internal threads in a portion of the length of each end, a pipe section extending into each end of said coupling member and radially spaced therefrom, a malleable sleeve tightly pressed between each of the pipe sections and the threads in said end portions of the coupling member, a tapered portion on one end of the malleable sleeve, and a compression sleeve threaded in each end of the coupling member, said compression sleeve having a tapered portion complemental to the tapered portion on the malleable sleeve whereby when the compression sleeve is forced against the malleable sleeve it effects said tight pressing of the malleable sleeve against the pipe section and the coupling member.

3. In combination in a pipe joint, a tubular coupling member having an internal annular flange and a tubular extension on each side of the annular flange, internal threads in each of the tubular extensions, a pipe section extending into each of the tubular extensions and radially spaced therefrom and axially spaced from the sides of the annular flange, a malleable sleeve tightly pressed between each of the pipe sections and the tubular extensions, each of said malleable sleeves having a flange pressed between said annular flange and the end of that respective pipe section, each of said malleable sleeves having an external tapered portion, and a compression sleeve threaded in each of the tubular extensions, each of said compression sleeves having an internal tapered portion to coact with the tapered portion of its malleable sleeve whereby when the compression sleeve is forced against the malleable sleeve it effects said tight pressing of the malleable sleeve against the pipe section and the tubular extension, the internal diameter of the pipe sections and the annular flange being substantially alike.

JOHN PONSAING.